BEST AVAILABLE COPY
April 17, 1928.
T. H. NOLL
ELECTRICAL STEAM GENERATION
Re. 16,935
Original Filed Aug. 31, 1923
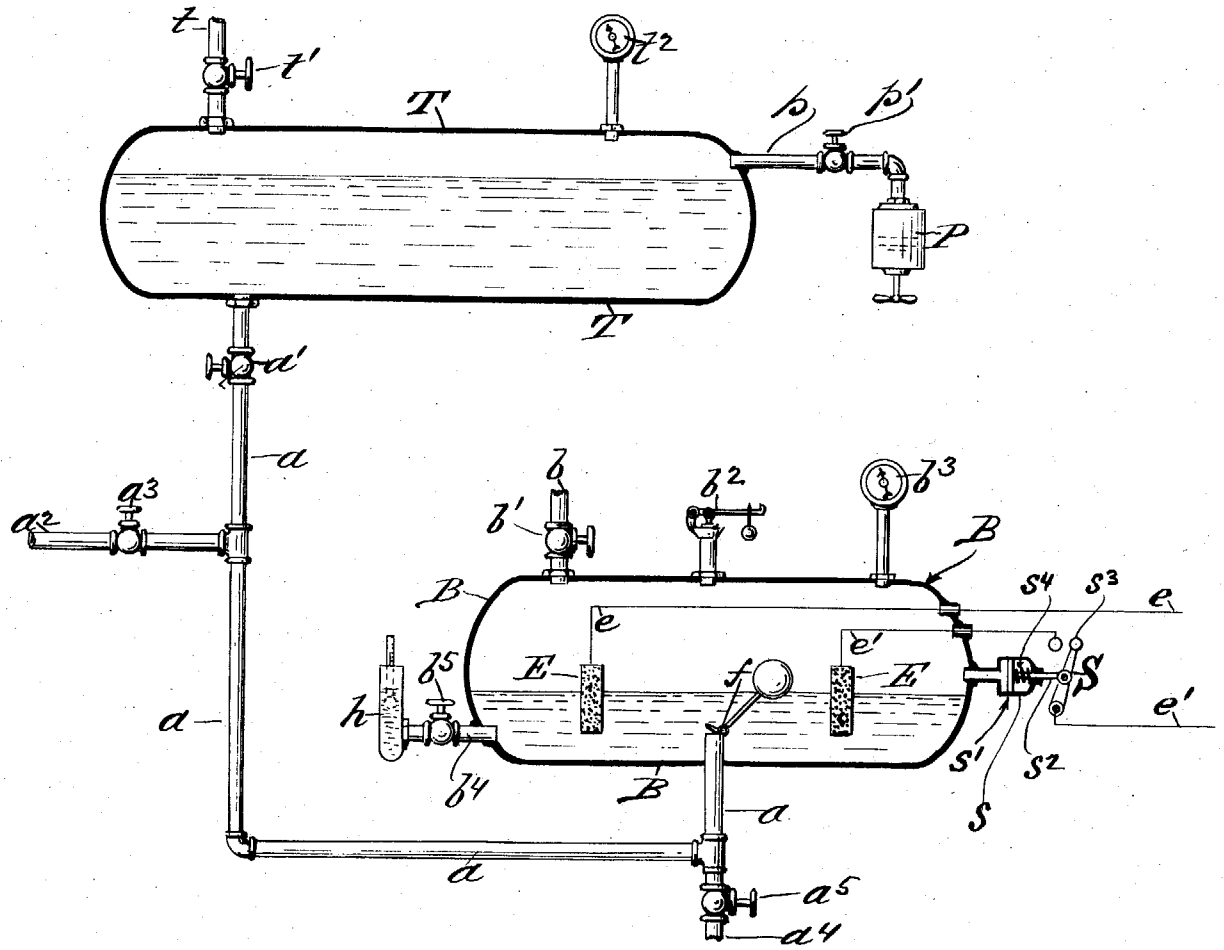
Inventor:
Theobold H. Noll,
By his Attorney,
Geo. Wm. Mitt Reissued Apr. 17, 1928.

BEST AVAILABLE COPY

Re. 16,935

UNITED STATES PATENT OFFICE.

THEOBALD H. NOLL, OF BRONX, NEW YORK, ASSIGNOR TO ANDREW J. DISPENZA.

ELECTRICAL STEAM GENERATION.

Original No. 1,539,692, dated May 26, 1925. Filed August 31, 1923, Serial No. 660,287. Application for reissue filed May 10, 1927. Serial No. 190,349.

My improvements relate to both method and apparatus employed in the generation of steam by means of an electrical current of any suitable character; and while the essential features of my invention are adaptable for use in the generation of steam generally for various other purposes, my object primarily is to afford a simple and inexpensive installation of the character designated, whereby low pressure steam may be effectually and economically produced for the heating of buildings, apartments, and analogous purposes, as well as for domestic use, my invention consisting in the specific combination and arrangement of apparatus and appurtenances described and claimed, all as hereinafter fully set forth.

The accompanying drawing illustrates diagrammatically a practical embodiment of the essential features of my invention, although I do not limit myself to the identical form, construction or arrangement of parts and apparatus shown by way of exemplification thereof, since changes in minor details and mechanical expedients may be resorted to with like results and without departing from the spirit and intent of my invention in this respect.

With this understanding B, represents a boiler shell of any suitable shape, connected with a water supply tank T, by means of piping $a$, $a$, in which is interposed a control valve $a'$. $t$, is an inlet pipe for the supply of impregnated water to the tank T, and $t'$, a shut off valve interposed in said inlet pipe $t$. $t^2$, is a pressure gauge communicating with the upper part of said supply tank T, and P, an air pressure pump also communicating with the upper part of said tank through the medium of the pipe $p$, in which is interposed a valve $p'$ which may be of check or other type.

An auxiliary water supply pipe $a^2$, provided with a valve $a^3$, is connected with the pipe $a$, which affords communication between the tank T, and the boiler B; and a draw-off or drain pipe $a^4$ provided with a valve $a^5$, is also connected with the lower member of the piping $a$.

The upper portion of the boiler B, is provided with a steam outlet pipe $b$, having a control valve $b'$, with a safety valve $b^2$, and with a pressure gauge $b^3$. Connected with the lower part of the boiler B, below the minimum water level therein, is a pipe $b^4$, and valve $b^5$, controlling communication with a hydrometric device $h$, by means of which the specific gravity of the liquid in the boiler B, may be ascertained when desirable.

E, E, represent spaced apart electrodes of any suitable character positioned in the boiler B, to contact with the liquid therein, and constituting the heating elements, $e$, $e'$, being the electrical conductors connected with any suitable extraneous source of electricity. S, is an automatic switch device interposed between the circuit $e$, $e'$, and controlled by the internal pressure of the boiler B. The switch device S, shown in the drawing by way of exemplification consists of a cylinder $s$, communicating with the interior of the boiler B, and provided with a piston $s'$, and rod $s^2$, the outer end of which latter is pivotally connected with a pivotally supported circuit closer $s^3$, a spring $s^4$, which tends constantly to close the circuit, being interposed between said piston $s'$, and the outer end of the cylinder $s$.

The normal liquid level in the boiler B, is controlled by a float valve $f$, which automatically regulates the admission of impregnated water from the supply pipe $a$.

In practice the supply tank or reservoir T, is charged, through the inlet pipe $t$, and valve $t'$, with a suitable quantity of water impregnated with a solvent adapted to increase its electric conductivity, sodium chloride being preferably used for the purpose, although I do not limit myself in this respect since other soluble substances may be substituted with substantially like results. The amount of solvent used depends on the intensity of the electrical current to be used in the boiler B. For instance, I have found it expedient where a current of 110 volts is used, to impregnate the water with approximately four teaspoonfuls of the said salt to each gallon thereof.

After the introduction of the impregnated water into the reservoir tank T, the valve $t'$, is closed, and the pressure in the tank increased by the injection of air above the liquid level through the pipe $p$, and valve $p'$, by means of the pump P, or equivalent air forcing device. The valves $p'$, $a^3$, $a^5$, and $b^5$, being now closed, the valve $a'$, is opened, admitting the impregnated water from the

BEST AVAILABLE COPY tank T, to the boiler B, the liquid level therein being controlled by the float valve $f$, on the end of the pipe $a$, within the boiler, and said level being maintained at a height sufficient to effect the immersion of the lower portions of the electrodes E, E.

The electric circuit $e$, $e'$, being now closed by means of the switch S, steam is generated in due course, and is drawn off through the service pipe $b$, and valve $b'$, any considerable excess of pressure within the boiler beyond a prescribed degree being automatically relieved through the medium of the safety valve $b^2$. But provision is also made for automatically opening the electric circuit if the internal pressure of the boiler exceeds a normal degree, as by means of the piston $s'$, which controls the electric switch S. When the internal pressure relaxes, the spring $s^4$, closes the switch S. The tank T, is essential as a means of equalizing steam pressure generated in boiler B, the air pressure in said tank T, keeping the requisite level of water therein and maintaining normal conditions in the boiler B, through the medium of the float $f$. The valve $a^3$, is closed when the valve $a'$, is open and vice versa.

The generation of steam will, of course, gradually concentrate the solvent with which the water is impregnated, and the resultant degree of density or specific gravity of liquid may be ascertained when desired, by opening the valve $b^5$, slightly, sufficient only to admit a suitable quantity of the solution to the hydrometric device $h$. When the latter indicates the necessity therefor a sufficient quantity of fresh water may be admitted to the boiler B, to neutralize the excess of impregnation, by opening the valve $a^3$ temporarily.

The simplicity of construction and arrangement of parts of my apparatus render it especially adaptable for installation for steam heating, etc., in buildings or apartments of moderate size; and its manipulation and operation does not require the employment of skilled labor for either purpose.

The manner in which the float valve $f$ functions, and the manner in which the tank T serves for equalizing steam and air pressure in boiler B and tank T, as above referred to may be described as follows:

When the liquid is first admitted under pressure from tank T into the boiler B the valve $f$ will be open. As the liquid rises within the boiler it will lift the float of said valve $f$ and at a predetermined point the valve will shut-off further admission of the liquid into the boiler. The level of the liquid at the time its inflow is shut-off is at the maximum height to which the liquid will ever attain, and the electrodes E are so disposed that they will at this time stand immersed to a maximum extent within the liquid. The electrodes will thus at this time have their maximum liquid heating and steam generating power for any given quality of electric current supplied to them.

The valve will thus determine the point of maximum steam generating capacity of the boiler under all normal conditions.

When current is supplied to the electrodes and the liquid is heated so that steam vapor rises therefrom sufficient to create a pressure within the boiler greater than the pressure within the tank T there will become present a tendency for the liquid within the boiler to move back again to the tank. Although the valve $f$ has until this time been held tightly sealed against movement of liquid into the boiler it is found in practice that, owing at least in part to the evaporation of the liquid in producing steam, said valve will nevertheless permit a return movement of the liquid to the tank T whenever the pressure within the boiler exceeds that of the tank, the return passage being at first very minute, but increasing in size as the level in the boiler falls and the float of the valve moves downwardlly.

The downward movement of the level within the boiler will continue, through the now open valve $f$ until the pressure within tank T equals the pressure within the boiler. The electrodes E, being stationary, will have a less part of their length immersed and will have a less steam generating power than before. If the liquid within the boiler should move downwardly to or near the bottom ends of the electrodes the steam generating power of the electrodes would be diminished to near zero and the steam pressure within the boiler would consequently fall and allow liquid to move back again from the tank to raise the level within the boiler. The level within the boiler will thus be automatically established at a point where the steam generating power of the electrodes will be just sufficient to maintain a steam pressure within the boiler equal to the pressure within the tank, it being here noted that the difference in altitude of the boiler and tank as illustrated is not under consideration, as the pressure within the tank may be manually altered at will by means of the air pump P.

An increase of pressure present as a cushion above the liquid in tank T will result in placing the level of liquid within the boiler at a higher plane at the time of balance between pressures in the boiler and tank than when the pressure in the tank is normally lower. This will increase the heat generating power of the electrodes to maintain the increased steam pressure, and hence it will be seen that operation of the pump $p$ to increase or diminish the pressure within the tank T may be relied upon as means to raise the pressure, and hence the heating

BEST AVAILABLE COPY ability, of the steam transmitted through the service connection *b* at any time.

The valve *f* is thus seen to serve as a safety control to prevent excessive rise of the liquid within the boiler at all times. It prevents an undesired amount of submersion of the electrodes and therefore prevents overloading or excessive current passage through the electrical apparatus connected with said electrodes, and yet permits the liquid to automatically find a level balanced between the pressures of the boiler and tank at all times during the normal operation of the mechanism.

While the switch *s* and its pressure control mechanism may be set to break the circuit to the electrodes at any desired pressure it is usually intended that this valve shall operate as an emergency safety mechanism to prevent generation of excessive pressure within the boiler in the event that for any reason the steam generating power of the electrodes should become greater than a set maximum, as for instance if the quality of current fed to the electrodes is increased or if the valve *f* should for any reason fail to hold the level of the liquid against rising around the electrodes above a fixed maximum.

As hereinabove set forth it is a part of this invention to positively add to the whole body of liquid concerned, both in the supply tank and in the boiler, a quantity of salt. Irrespective of the movement of the liquid to and from the boiler and tank it is at all times, and in all parts, of a predetermined salt content. The salt has been added in definite quantity to the whole body of liquid and its presence is of material importance in that it enables the use of small electrodes, and the employment of only a small amount of liquid at any one time within the boiler. This positive addition of salt in known and appreciable quantity makes possible the generation of ample quantities of steam within an extremely small boiler and at great economy in the consumption of electric current.

As many changes could be made in this construction without departing from the scope of the invention as defined in the following claims, it is intended that all matter contained in the above description or shown in the accompanying drawings, shall be interpreted as illustrative only and not in a limiting sense.

What I claim as my invention and wish to secure by Letters Patent is:

1. In electrical steam heating apparatus of the character designated, the combination of a liquid reservoir tank, means for injecting air under pressure thereinto, a boiler connected with said reservoir tank by means which admit of the transfer of liquid from said tank to said boiler, electrodes positioned in said boiler and connected with an electric circuit, and an exit service steam conduit connected with said boiler, substantially in the manner and for the purpose set forth.

2. In electrical steam heating apparatus of the character designated, the combination of a liquid reservoir tank, means for injecting air under pressure thereinto, a boiler connected with said reservoir tank by means which admit of the transfer of liquid from said tank to said boiler, electrodes positioned in said boiler and connected with an electric circuit, and an exit service steam conduit connected with said boiler, together with a switch interposed in said electric circuit and controlled by means actuated by the steam pressure in said boiler, substantially in the manner and for the purpose designated.

3. In electrical steam heating apparatus of the character designated, the combination of a liquid reservoir tank, means for injecting air under pressure thereinto, a boiler connected with said reservoir tank by means which admit of the transfer of liquid from said tank to said boiler, electrodes positioned in said boiler and connected with an electric circuit and an exit service steam conduit connected with said boiler, together with a float valve in said boiler arranged to control the admission of liquid thereinto, substantially in the manner and for the purpose set forth.

4. In electrical steam heating apparatus of the character designated, the combination of a liquid reservoir tank, means for injecting air under pressure thereinto, a boiler connected with said reservoir tank by means which admit of the transfer of liquid from said tank to said boiler, electrodes positioned in said boiler and connected with an electric circuit and an exit service steam conduit connected with said boiler, together with an hydrostatic test device connected with said boiler, substantially in the manner and for the purpose set forth.

5. In electrical steam heating apparatus of the character designated, the combination of a liquid reservoir tank, means for injecting air under pressure thereinto, a boiler connected with said reservoir tank by means which admit of the transfer of liquid from said tank to said boiler, electrodes positioned in said boiler and connected with an electric circuit and an exit service steam conduit connected with said boiler, together with means independent of the reservoir tank for admitting water to said boiler, substantially in the manner and for the purpose designated.

6. An electrically operated steam generator comprising a boiler adapted to contain a quantity of liquid, an inlet opening through which liquid may move into and raise a level within the boiler, said boiler having a steam outlet opening therefrom, a float valve as-

BEST AVAILABLE COPY sociated with said inlet opening arranged to be controlled by the liquid level for closing the opening when the level has attained a given height, electrodes arranged to be partly submerged by said liquid beneath said level, and means to supply electric current to said electrodes.

7. An electrically operated steam generator comprising a boiler adapted to contain a quantity of liquid, an inlet opening through which liquid may move into and raise a level within the boiler, said boiler having a steam outlet opening therefrom, electrically operable steam generating means arranged to be controlled by the level of said liquid, and a valve for said inlet opening arranged also to be controlled by the level of said liquid.

8. An electrically operated steam generator comprising a boiler adapted to contain a quantity of liquid, an inlet opening through which liquid may move into and raise a level within the boiler, said boiler having a steam outlet opening therefrom, electrically operable steam generating means arranged to be controlled by the level of said liquid, and a valve for said inlet opening arranged also to be controlled by the level of said liquid, together with a safety device arranged to render the electrical operable steam generating means inoperative in the event of failure of said valve.

9. An electrically operated steam generator comprising means providing an air pressure compartment and a steam pressure compartment, each of said compartments being adapted to contain a quantity of liquid, means providing a passage-way through which liquid may move between said compartments, electrodes arranged in the steam compartment adapted to be at least in part submerged beneath the level of said liquid, means by which to supply electric energy to said electrodes for thereby generating steam pressure in said steam compartment effective to force down the liquid level about said electrodes and thereby raise the liquid level against the air pressure in the air compartment, the liquid level in the steam compartment being thus held against excessive downward movement in the presence of a given pressure in said compartments, and there being a steam delivery opening from said steam compartment.

10. An electrically operated steam generator comprising means providing an air pressure compartment and a steam pressure compartment, each of said compartments being adapted to contain a quantity of liquid, means providing a passage-way through which liquid may move between said compartments, electrodes arranged in the steam compartment adapted to be at least in part submerged beneath the level of said liquid, means by which to supply electric energy to said electrodes for thereby generating steam pressure in said steam compartment effective to force down the liquid level about said electrodes and thereby raise the liquid level against the air pressure in the air compartment, the liquid level in the steam compartment being thus held against excessive downward movement in the presence of a given pressure in said compartment, there being a steam delivery opening from said steam compartment, and means by which to manually alter at will the pressure in one of said compartments.

11. An electrically operated steam generator comprising means providing an air pressure compartment and a steam pressure compartment, each of said compartments being adapted to contain a quantity of liquid, means providing a passage-way through which liquid may move between said compartments, electrodes arranged in the steam compartment adapted to be at least in part submerged beneath the level of said liquid, means by which to supply electric energy to said electrodes for thereby generating steam pressure in said steam compartment effective to force down the liquid level about said electrodes by driving a portion of said liquid through said passage-way to the air compartment whereby to automatically adjust the steam generating power of the electrodes, and a valve for said passage-way automatically operable to limit the maximum rise of liquid within the steam compartment, there being a steam delivery opening from said steam compartment.

12. An electrically operated steam generator comprising means providing a steam compartment and a liquid supply compartment, connections between the steam compartment and the supply compartment by means of which liquid may move to and from the steam compartment, a valve arranged in said connections automatically operable to determine the maximum amount of liquid within the steam compartment, electrodes spaced apart within the steam compartment arranged to extend downwardly so as to be partly submerged beneath the level of the liquid in the steam compartment, electrical connections by which to energize said electrodes for thereby heating the liquid and generating steam within the steam compartment, the steam having a tendency to depress the level of the liquid in the steam compartment and to thereby raise the level in the supply compartment for at the same time producing less submergence of the electrodes and consequent reduced steam generating power of the electrodes, and a manually operable pump connected with the supply compartment by which pressure may be applied upon the liquid within the supply compartment in sufficient quantity to partially counter-act the pressure of the steam

BEST AVAILABLE COPY in the steam compartment and thereby hold the level of the liquid in the steam compartment balanced at a point below the maximum allowed by said valve, there being a steam delivery opening from said steam compartment.

13. An electrically operated steam generator comprising means providing a steam compartment and a liquid supply compartment, connections between the steam compartment and the supply compartment by means of which liquid may move to and from the steam compartment, a pair of electrodes spaced apart within the steam compartment intended to be partly submerged by liquid in said compartment, electrical connections by which to energize said electrodes, the steam compartment having a steam discharge opening therefrom, and the liquid having a fixed amount of sodium chloride contained in solution therein for the purpose set forth.

14. An electrically operated steam generator comprising a boiler arranged to contain a quantity of liquid, a pair of electrodes spaced apart therein intended to be partly submerged by the liquid, electrical connections by which to energize said electrodes whereby to generate steam from said liquid, the boiler having a steam discharge opening therefrom, and the liquid having sodium chloride in solution therein in the proportion approximately of four teaspoonfuls to each gallon of liquid, for the purpose set forth.

15. An electrically operated steam generator comprising a boiler arranged to contain a quantity of liquid, a pair of electrodes spaced apart therein intended to be partly submerged by the liquid, electrical connections by which to energize said electrodes whereby to generate steam from said liquid, the boiler having a steam discharge opening therefrom, and the liquid having sodium chloride in solution therein in the proportion of upwardly of three teaspoonfuls to each gallon of liquid, for the purpose set forth.

16. An electrically operated steam generator comprising means providing a steam compartment, a tank adapted to contain a supply of liquid of relatively high conductivity, means providing a separate supply of liquid of a relatively lower conductivity, selectively operable means whereby liquids from these two supplies may be fed into the steam compartment in selected quantities respectively at will for thereby altering the conductivity of the liquid mixture within the steam compartment, and electrically operable means within the steam compartment adapted to utilize the conductivity of the liquid mixture there for generating steam from said liquid.

In testimony whereof I affix my signature.

THEOBALD H. NOLL.